(12) United States Patent
Kim et al.

(10) Patent No.: US 11,343,786 B2
(45) Date of Patent: May 24, 2022

(54) METHOD FOR BROADCAST GATEWAY SIGNALING USING CLOUD NETWORK AND APPARATUS FOR THE SAME

(71) Applicant: ELECTRONICS AND TELECOMMUNICATIONS RESEARCH INSTITUTE, Daejeon (KR)

(72) Inventors: Soon-Choul Kim, Daejeon (KR); Jae-Young Lee, Daejeon (KR); Hye-Ju Oh, Daejeon (KR); Hyun-Jeong Yim, Sejong-si (KR); Dong-Joon Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/182,955

(22) Filed: Feb. 23, 2021

(65) Prior Publication Data
US 2022/0132452 A1 Apr. 28, 2022

(30) Foreign Application Priority Data

Oct. 27, 2020 (KR) .......................... 10-2020-0140284
Jan. 29, 2021 (KR) .......................... 10-2021-0012830

(51) Int. Cl.
*H04W 56/00* (2009.01)
*H04L 69/22* (2022.01)
(Continued)

(52) U.S. Cl.
CPC ......... *H04W 56/0045* (2013.01); *H04L 12/18* (2013.01); *H04L 65/608* (2013.01); *H04L 67/2842* (2013.01); *H04L 69/22* (2013.01)

(58) Field of Classification Search
CPC ..... H04L 69/22; H04L 67/2842; H04L 12/18; H04L 65/608; H04W 56/0045
(Continued)

(56) References Cited

U.S. PATENT DOCUMENTS 6,377,565 B1 * 4/2002 Puckette, IV ...... H04B 7/18504
370/337
2003/0041093 A1 * 2/2003 Yamane ................ H04L 41/046
709/201
(Continued)

FOREIGN PATENT DOCUMENTS

EP 0727126 B1 * 4/2002 ......... H04N 21/4381
EP 1209938 A1 * 5/2002 ......... H04W 56/0045
(Continued)

OTHER PUBLICATIONS

ATSC, Scheduler/Studio to Transmitter Link, Dec. 5, 2017, Advanced Television Systems Committee, https://www.atsc.org/wp-content/uploads/2016/10/A324S32-266r29-Scheduler-STL.pdf (Year: 2017).*
(Continued)

*Primary Examiner* — Zi Ye
(74) *Attorney, Agent, or Firm* — Kile Park Reed & Houtteman PLLC

(57) ABSTRACT

Disclosed herein are a method for broadcast gateway signaling using a cloud network and an apparatus for the same. The method includes generating an outer packet corresponding to the outer layer of a tunneling system using an inner packet corresponding to the inner layer of the tunneling system, generating a header of the outer packet, and transmitting the outer packet to a transmitter through a Studio-to-Transmitter Link (STL). The header includes an STL propagation delay time field indicating a reception wait time for an STL stream corresponding to the outer packet.

18 Claims, 9 Drawing Sheets

(51) Int. Cl.
*H04L 65/65* (2022.01)
*H04L 12/18* (2006.01)
*H04L 67/568* (2022.01)

(58) Field of Classification Search
USPC .......................................................... 370/312
See application file for complete search history.

(56) References Cited

U.S. PATENT DOCUMENTS

| 2008/0187009 | A1* | 8/2008 | Kim | H04J 3/0682 |
| | | | | 370/517 |
| 2019/0387035 | A1 | 12/2019 | Lee et al. | |
| 2020/0128511 | A1 | 4/2020 | Lee et al. | |

FOREIGN PATENT DOCUMENTS

| KR | 10-2019-0066572 | 6/2019 |
| KR | 10-2128945 | 7/2020 |

OTHER PUBLICATIONS

Junius Kim, Distribution of the Analog or Digital FM Composite Multiplex Signal across IP Networks, Nov. 5, 2016, https://web.archive.org/web/20161105001024/https://www.gatesair.com/documents/papers/Kim_-_Parikh_-_Distribution_of_the_Analog_or_Digital_FM_Composite.pdf (Year: 2016).*

"ATSC Candidate Standard: Revision of A/324:2018, Scheduler / Studio to Transmitter Link", Advanced Television Systems Committee, Oct. 7, 2020; Doc. S32-266r63; 121 pages.

* cited by examiner

| Syntax | No. of Bits | Format |
|---|---|---|
| RTP_Fixed_Header() { (skipped) ..........      protocol_version      if ( PT == STLTP ) {         redundancy         number_of_channels         STL_propa_delay         reserved     }     else {         reserved     }     packet_offset } | 2  2 2 6 4  14  16 | Uimsbf  Uimsbf Uimsbf Uimsbf for (i=0; i<4; i++) '0'  for (i=0; i<14; i++) '0'  Uimsbf |

METHOD FOR BROADCAST GATEWAY SIGNALING USING CLOUD NETWORK AND APPARATUS FOR THE SAME

CROSS REFERENCE TO RELATED APPLICATIONS

This application claims the benefit of Korean Patent Applications No. 10-2020-0140284, filed Oct. 27, 2020, and No. 10-2021-0012830, filed Jan. 29, 2021, which are hereby incorporated by reference in their entireties into this application.

BACKGROUND OF THE INVENTION

1. Technical Field

The present invention relates generally to technology for broadcast gateway signaling using a cloud network, and more particularly to technology for efficient unicast transmission of a Studio-to-Transmitter Link (STL) stream between an ATSC 3.0 broadcast gateway and multiple transmitters using a cloud environment.

2. Description of the Related Art

The terrestrial UHDTV broadcast standard of South Korea is configured such that commercial services are provided based on the ATSC 3.0 North American terrestrial broadcast standard specification. In order to stably transmit broadcast streams in the ATSC 3.0 environment, a dedicated network (microwave, a dedicated IP line, or the like) is commonly used for a network section (STL) between a broadcast gateway and transmitters. However, an increase in the number of transmitters causes an increase in the communication costs borne by a broadcast company due to the use of the dedicated network. In the current ATSC 3.0 STL/SFN standard (A/324), a broadcast gateway is defined to transmit an IP/UDP multicast stream over a dedicated network or to transmit redundant unicast streams (up to three redundant unicast streams) over a public network (the Internet). When the broadcast gateway transmits an IP/UDP multicast stream over a dedicated network, the cost of using the dedicated network is burdensome, whereas when the broadcast gateway transmits redundant unicast streams over a public network, a heavy traffic burden may be imposed on the network because the same stream is redundantly transmitted.

DOCUMENTS OF RELATED ART (Patent Document 1) Korean Patent Application Publication No. 10-2019-0066572, published on Jun. 13, 2019 and titled "Apparatus and method for managing virtualization function".

SUMMARY OF THE INVENTION

An object of the present invention is to guarantee efficient transmission of an STL unicast packet using an edge cloud in a cloud environment and to effectively reduce the expense of a dedicated network for respective transmitters.

Another object of the present invention is to use widespread cloud infrastructure, thereby reducing the expense of a dedicated network used for an STL section between an existing broadcast gateway and transmitters while adhering to the ATSC 3.0 standard specification as closely as possible.

A further object of the present invention is to enable reception of a recovery packet using an edge cloud, thereby responding to packet loss or delay, which can occur during fast transmission of a unidirectional unicast stream.

In order to accomplish the above objects, a method for broadcast gateway signaling according to the present invention includes generating an outer packet corresponding to the outer layer of a tunneling system using an inner packet corresponding to the inner layer of the tunneling system; and generating a header of the outer packet and transmitting the outer packet to a transmitter through a Studio-to-Transmitter Link (STL). The header may include an STL propagation delay time field representing a reception wait time for an STL stream corresponding to the outer packet.

Here, the STL propagation delay time field may be a 6-bit field, and may be set to an integer ranging from '0' to '63', indicating time in units of milliseconds.

Here, the reception wait time may be a time during which the transmitter forms a broadcast transmission signal to transmit to an RF channel using the outer packet.

Here, when loss occurs in the outer packet transmitted to the transmitter, a lost packet recovery process may be repeatedly performed during the reception wait time.

Here, the lost packet recovery process may be performed through a Studio-to-Transmitter Link (STL) stream cache server that operates as an edge cloud node in a cloud infrastructure environment.

Here, the outer packet may be transmitted to the STL stream cache server in the form of a multicast packet through an RTP/UDP/IP multicast protocol stack, and may be transmitted to the transmitter in the form of a unicast packet through an RTP/UDP/IP unicast protocol stack.

Here, a cache pool for a packet, the reception wait time of which has not expired, among outer packets transmitted to the STL stream cache server, may be formed.

Here, the method may further include sharing a public key with the transmitter based on a key delivery process; performing authentication of a reception registration request message received from the transmitter using the public key of the transmitter; and providing information about the address of the STL stream cache server to the transmitter when the authentication succeeds.

Here, the reception registration request message may include a message sequence number, the identifier of the public key of the transmitter, a UDP port number, and the private key signature of the transmitter, and the authentication may be performed in such a way that a message authentication code based on the private key signature of the transmitter is checked using the public key of the transmitter.

Here, the method may further include sharing the public key of the transmitter with the STL stream cache server, and the lost packet recovery process may be performed when authentication of a recovery packet request message, transmitted by the transmitter to the STL stream cache server, succeeds, the authentication being performed based on the public key of the transmitter.

Here, when a lost packet is not recovered during the reception wait time, the lost packet may be processed by at least one of inputting a null packet and discarding the lost packet.

Here, the inner packet may be encapsulated through the outer packet.

Here, the tunneling system may be configured such that a group of parallel and independent packet streams, corresponding to the inner packet, is carried within a single packet stream corresponding to the outer packet.

Also, a broadcast gateway apparatus according to an embodiment of the present invention includes a processor for generating an outer packet corresponding to the outer layer of a tunneling system using an inner packet corresponding to the inner layer of the tunneling system, generating a header of the outer packet, and transmitting the outer packet to a transmitter through a Studio-to-Transmitter Link (STL); and memory for storing the outer packet. The header may include an STL propagation delay time field representing a reception wait time for an STL stream corresponding to the outer packet.

Here, the STL propagation delay time field may be a 6-bit field, and may be set to an integer ranging from '0' to '63', indicating time in units of milliseconds.

Here, the reception wait time may be a time during which the transmitter forms a broadcast transmission signal to transmit to an RF channel using the outer packet.

Here, when loss occurs in the outer packet transmitted to the transmitter, a lost packet recovery process may be repeatedly performed during the reception wait time.

Here, the lost packet recovery process may be performed through a Studio-to-Transmitter Link (STL) stream cache server that operates as an edge cloud node in a cloud infrastructure environment.

Here, the outer packet may be transmitted to the STL stream cache server in the form of a multicast packet through an RTP/UDP/IP multicast protocol stack and may be transmitted to the transmitter in the form of a unicast packet through an RTP/UDP/IP unicast protocol stack.

Here, a cache pool for a packet, the reception wait time of which has not expired, among outer packets transmitted to the STL stream cache server, may be formed.

Here, the processor may share a public key with the transmitter based on a key delivery process, may perform authentication of a reception registration request message received from the transmitter using the public key of the transmitter; and may provide information about the address of the STL stream cache server to the transmitter when the authentication succeeds.

Here, the reception registration request message may include a message sequence number, the identifier of the public key of the transmitter, a UDP port number, and the private key signature of the transmitter, and the authentication may be performed in such a way that a message authentication code based on the private key signature of the transmitter is checked using the public key of the transmitter.

Here, the processor may share the public key of the transmitter with the STL stream cache server, and the lost packet recovery process may be performed when authentication of a recovery packet request message, transmitted by the transmitter to the STL stream cache server, succeeds, the authentication being performed based on the public key of the transmitter.

Here, when a lost packet is not recovered during the reception wait time, the lost packet may be processed by at least one of inputting a null packet and discarding the lost packet.

Here, the inner packet may be encapsulated through the outer packet.

Here, the tunneling system may be configured such that a group of parallel and independent packet streams, corresponding to the inner packet, is carried within a single packet stream corresponding to the outer packet.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
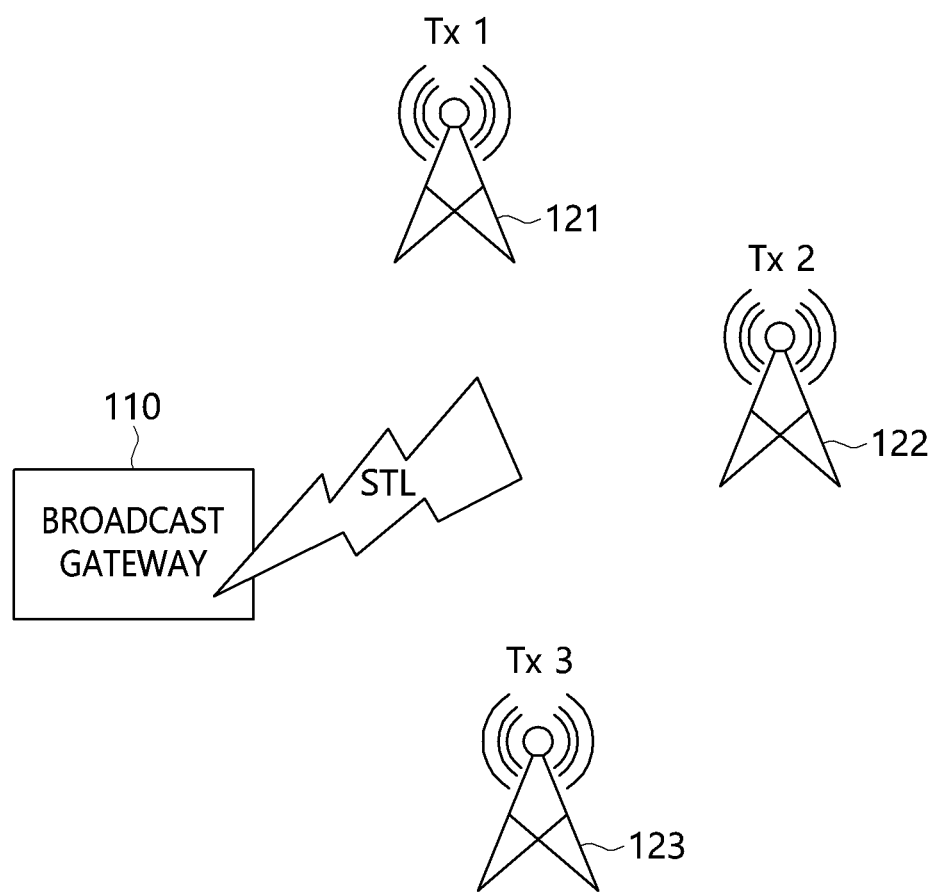
FIG. 1 is a block diagram illustrating a system for transmitting a broadcast signal according to an embodiment of the present invention.

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

Recently, cloud infrastructure expansion and Internet quality improvement (reduced packet transmission loss and delay) have increased expectations for Internet services provided over a public network. Accordingly, the present invention intends to provide a method for stably transmitting an STL unicast stream even in a public network using a cloud infrastructure environment.

For example, because transmitting multicast streams to multiple transmitters over a public network is inappropriate due to the characteristics of the public network, fast transmission of a unidirectional unicast stream is expected to be used instead. In this case, in preparation for packet loss or delay that can occur in such a unicast stream, a recovery packet may be provided using an edge cloud. Also, the present invention intends to maintain compatibility with the ATSC 3.0 standard and to guarantee stable transmission of STL unicast streams.

FIG. 1 is a block diagram illustrating a system for transmitting a broadcast signal according to an embodiment of the present invention.

Referring to FIG. 1, a system for transmitting a broadcast signal according to an embodiment of the present invention includes a broadcast gateway apparatus 110 and multiple transmitters 121, 122 and 123.

The broadcast gateway apparatus 110 transmits broadcast transmission packets for a broadcast service to one or more of the multiple transmitters 121, 122 and 123. Here, the broadcast transmission packets may be transmitted through a Studio-to-Transmitter Link (STL). Here, the broadcast transmission packets may be Studio-to-Transmitter Link Transport (tunneling) Protocol (STLTP) packets.

Here, the Studio-to-Transmitter Link (STL) may be a data transmission/reception link between the broadcast gateway apparatus 110 and the transmitters 121, 122 and 123 in a broadcast transmission system, and may be a fiber, satellite, or microwave link. Here, the STL may be a wired or wireless link, and may be a link through which data is transmitted and received using a packet-based protocol such as RTP/UDP/IP or the like.

The transmitters 121, 122 and 123 generate the broadcast signals to provide to receivers using the broadcast transmission packets transmitted from the broadcast gateway apparatus 110 and transmit the same to the receivers over a broadcast network. Here, the transmitters 121, 122 and 123 may be high-power transmitters, or may be low-power transmitters, such as gap fillers or the like.

When the multiple transmitters 121, 122 and 123 are high-power transmitters, broadcast companies may use a dedicated network for a reliable STL. When the multiple transmitters 121, 122 and 123 are low-power transmitters for coverage extension, the broadcast companies may transmit broadcast transmission packets using a public network, rather than a dedicated network.

Here, when the STL between the broadcast gateway apparatus 110 and the multiple transmitters 121, 122 and 123 is a public network, there is an advantage in that costs are reduced compared to the case where a dedicated network is used, but reliability may be reduced.

Accordingly, a method for guaranteeing reliability even when the STL between the broadcast gateway apparatus 110 and the multiple transmitters 121, 122 and 123 is a public network is required.

For example, when a public network is used, redundancy may be provided by transmitting multiple identical broadcast transmission packets, or an Error Correction Code (ECC) may be applied to broadcast transmission packets.

For example, when the transmitter 121 is an important high-power transmitter, a broadcast transmission packet may be transmitted from the broadcast gateway apparatus 110 to the transmitter 121 using a dedicated network. Here, the broadcast transmission packet may be a multicast IP packet.

For example, when the transmitter 122 is a less important low-power transmitter or a gap filler, a broadcast transmission packet from the broadcast gateway apparatus 110 to the transmitter 122 may be transmitted using a public network. Here, the broadcast transmission packet may be a unicast IP packet.

Here, for the unicast IP packet transmitted using a public network, redundancy may be provided in order to improve reliability, and an error correction code may be applied.

Here, the broadcast transmission packet may correspond to an outer packet. That is, after an inner packet is generated by encapsulating a baseband packet, a preamble, and a timing and management (Timing & Management) packet, an outer packet may be generated using the inner packet, and the outer packet may be the broadcast transmission packet.

That is, the inner packet may be carried in the outer packet. Here, the outer packet may be a tunneling packet, and the inner packet may be a tunneled packet.

Here, the inner packet may include a baseband packet, a preamble packet, and a timing and management (Timing & Management) packet, and may correspond to the inner layer of a tunneling system. Here, the outer packet may correspond to the outer layer of the tunneling system. Here, the inner packet may be encapsulated through the outer packet.

Here, the tunneling system may correspond to a process by which a group of parallel and independent packet streams corresponding to the inner packets is carried within a single packet stream corresponding to the outer packet.

Figure 2:
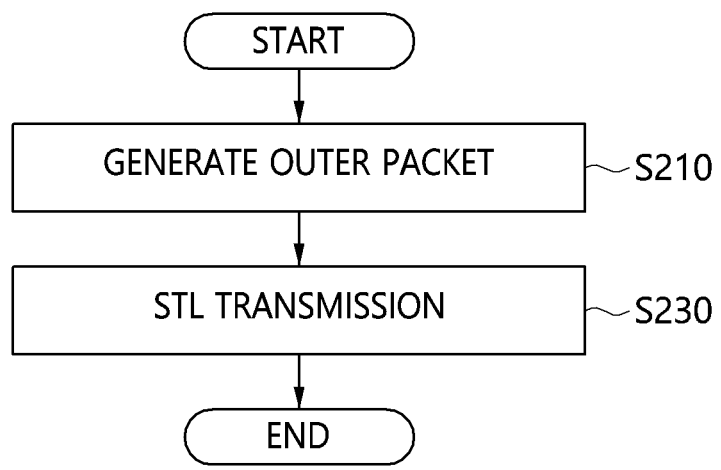
FIG. 2 is a flowchart illustrating a method for broadcast gateway signaling according to an embodiment of the present invention.

FIG. 2 is a flowchart illustrating a method for broadcast gateway signaling according to an embodiment of the present invention.

Referring to FIG. 2, in the method for broadcast gateway signaling according to an embodiment of the present invention, an outer packet corresponding to the outer layer of a tunneling system is generated at step S210 using an inner packet corresponding to the inner layer of the tunneling system.

Also, in the method for broadcast gateway signaling according to an embodiment of the present invention, a header of the outer packet is generated, and the outer packet is transmitted to a transmitter through a Studio-to-Transmitter Link (STL) at step S220.

Figures 3, 4:
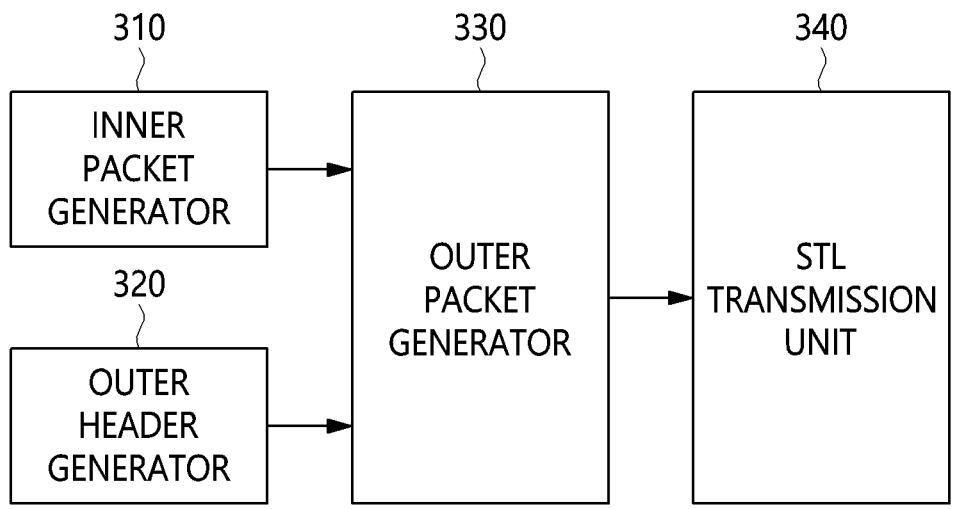
FIG. 3 is a view illustrating an example of a broadcast gateway apparatus according to the present invention.
FIG. 4 is a view illustrating an example of the structure of the header of an outer packet according to the present invention.

For example, referring to FIG. 3, a broadcast gateway apparatus according to an embodiment of the present invention includes an inner packet generator 310, an outer packet header generator 320, an outer packet generator 330, and an STL transmission unit 340.

The inner packet generator 310 generates an inner packet, corresponding to the inner layer of a tunneling system, by including a baseband packet, a preamble, and a timing and management (Timing & Management) packet.

The outer packet generator 330 generates an outer packet, corresponding to the outer layer of the tunneling system, using the inner packet.

The outer packet header generator 320 generates a header of the outer packet.

The STL transmission unit 340 transmits the outer packet to a transmitter through a Studio-to-Transmitter Link (STL).

Here, the inner packet may be encapsulated through the outer packet.

Here, the tunneling system may correspond to a process by which a group of parallel and independent packet streams corresponding to the inner packets is carried within a single packet stream corresponding to the outer packet.

Here, the outer packet may be a broadcast transmission packet.

Here, the outer packet may be transmitted through an RTP/UDP/IP unicast protocol stack.

Here, in order to stably transmit the STL unicast stream to the transmitters included in an STL/SFN group, the broadcast gateway apparatus notifies the transmitters of a wait time for receiving a packet, thereby enabling RF transmission by the transmitters to be performed normally.

To this end, the header of the outer packet may include an STL propagation delay time field, which indicates a reception wait time for an STL stream corresponding to the outer packet.

Here, the time set in the STL propagation delay time field may be a reception wait time or an STL propagation delay time.

Here, the STL propagation delay time field is a 6-bit field, and may be set to an integer ranging from '0' to '63', which indicates time in units of milliseconds.

For example, the header of an outer packet (a broadcast transmission packet or a tunneling packet) may be generated as illustrated in FIG. 4.

Referring to FIG. 4, the header of an outer packet corresponds to RTP_Fixed_Header( ), and the STL propagation delay time field may correspond to 'STL_propa_delay'.

For example, the field 'STL_propa_delay' (6 bits) may be defined by including the same in the reserved field (10 bits) of RTP_Fixed_Header( ).

Here, 'uimsbf' means 'unsigned integer, most significant bit first'.

Here, the header of the outer packet in FIG. 4 may be a kind of RTP header.

Here, all of the devices receiving STL unicast/multicast streams through the broadcast gateway apparatus may reassemble RTP packets during the reception wait time of the packet, which is set in the 'STL_propa_delay' field.

Therefore, the value of the 'STL_propa_delay' field may be considered when RTP packet recovery is repeatedly performed in order to enable a transmitter to form a complete STL stream (a continuous RTP packet stream) before the transmission time of a physical layer frame.

In other words, the reception wait time may be the time during which the transmitter forms the broadcast transmission signal to transmit to an RF channel using the outer packet.

Figure 5:
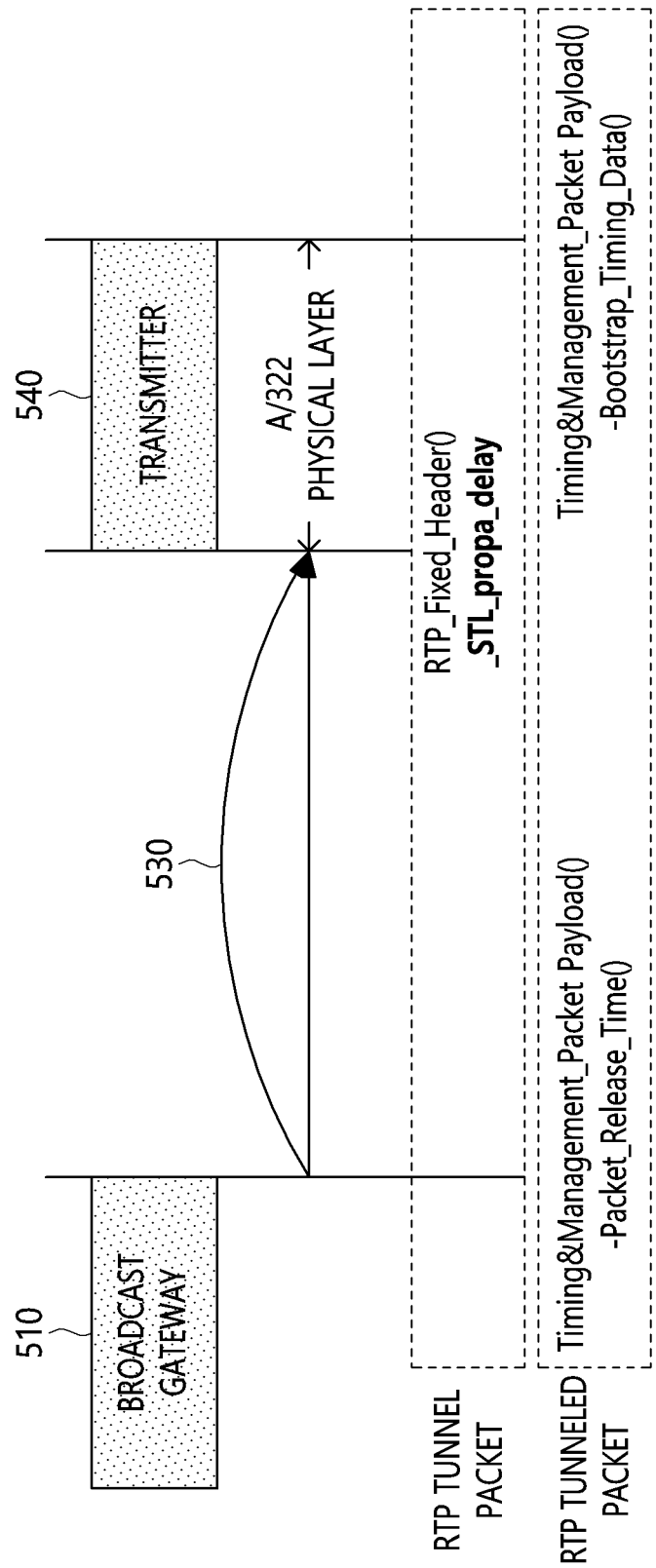
FIG. 5 is a view illustrating an example of a lost packet recovery process during a reception wait time according to the present invention.

For example, referring to FIG. 5, in the event of loss of the outer packet (RTP tunnel packet) transmitted from the broadcast gateway apparatus 510 to the transmitter 520, a lost packet recovery process may be repeatedly performed during the reception wait time 530 set in the 'STL_propa_delay' field of RTP_Fixed_Header( ).

Here, the RTP tunneled packet illustrated in FIG. 5 may be an inner packet, and Packet_Release_Time( ) or Bootstrap_Timing_Data( ) of Timing&Management_Packet Payload( ) may correspond to an existing time field according to the A/324 standard.

If a continuous RTP packet stream cannot be formed within the reception wait time set in the STL propagation delay time field (in the event of packet loss/delay or failure in authentication), the STL stream for the corresponding time section is filled with null packets according to a device operation policy, after which an RF transmission process may be performed, or the packets of the corresponding section may be discarded.

For example, when the value of the 'STL_propa_delay' field is set to '10', the reception wait time for the outer packet is 10 milliseconds, and the transmitter repeatedly performs RTP packet recovery for the outer packet within 10 milliseconds, thereby forming the broadcast transmission signal to transmit to an RF channel.

Here, the lost packet recovery process may be performed through a Studio-to-Transmitter Link (STL) stream cache server that operates as an edge cloud node in a cloud infrastructure (infra) environment.

Figure 6:
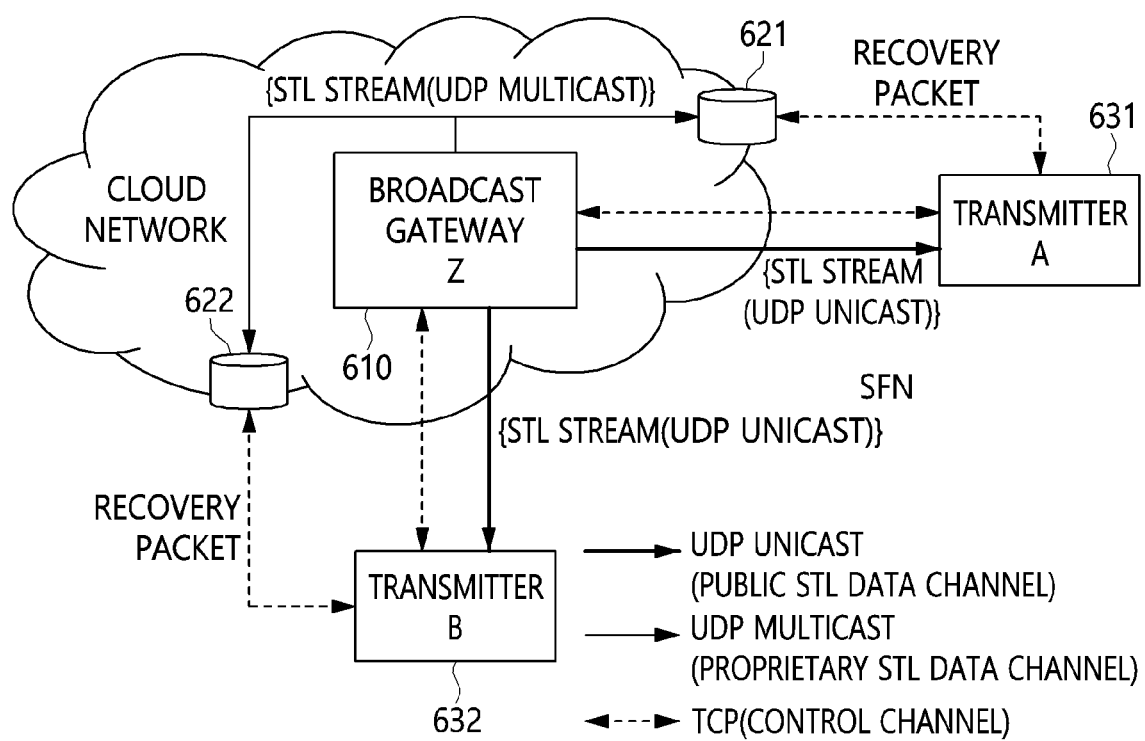
FIG. 6 is a block diagram illustrating a system for transmitting a broadcast signal for lost packet recovery according to an embodiment of the present invention.

For example, the present invention may provide the configuration illustrated in FIG. 6 in order to guarantee stable transmission of an STL stream over a public network using an edge cloud in a cloud infrastructure environment.

Referring to FIG. 6, the ATSC 3.0 broadcast gateway apparatus 610 (broadcast gateway Z) may operate in a cloud infrastructure environment, and may have settings in which it can transmit an STL multicast stream to edge cloud nodes.

Here, the edge cloud nodes may correspond to STL stream cache servers 621 and 622.

Following the recommendation of the technology standard (A/324), the broadcast gateway apparatus 610 based on ATSC 3.0 and the transmitters 631 and 632, illustrated in FIG. 6, may apply a packet authentication method in order to respond to a man-in-the-middle attack in the STL section.

To this end, the method for broadcast gateway signaling according to an embodiment of the present invention may include sharing a public key between the broadcast gateway apparatus and the transmitters based on a key delivery process.

For example, referring to FIG. 6, the broadcast gateway apparatus 610 may share a public key with the transmitters 631 and 632 included in an STL/SFN group in advance. Through this key delivery process, the broadcast gateway apparatus 610 may store the private key thereof (Z's private key), the public key of the transmitter A (A's public key), and the public key of the transmitter B (B's public key), the transmitter A 631 may store the private key thereof (A's private key) and the public key of the broadcast gateway apparatus (Z's public key), and the transmitter B 632 may store the private key thereof (B's private key) and the public key of the broadcast gateway apparatus (Z's public key).

Then, the broadcast gateway apparatus 610 may transmit an STL multicast stream having the same format as that in the existing standard to the STL stream cache servers 621 and 622 corresponding to the edge cloud nodes after applying packet authentication thereto.

Here, the STL stream cache servers 621 and 622 may store the STL multicast stream received from the broadcast gateway apparatus 610 in a cache pool for a limited amount of time.

That is, a cache pool may be configured for a packet, of which the reception wait time set in the STL propagation delay time field has not expired, among the outer packets transmitted to the STL stream cache server.

Here, the STL stream transmitted from the broadcast gateway apparatus 610 corresponds to an outer packet. The outer packet may be transmitted to the STL stream cache server in the form of a multicast packet through an RTP/UDP/IP multicast protocol stack, and may be transmitted to a transmitter in the form of a unicast packet through an RTP/UDP/IP unicast protocol stack.

Here, because the STL multicast stream is transmitted over a dedicated network between the broadcast gateway apparatus 610 and the STL stream cache servers 621 and 622, corresponding to the edge cloud nodes, in cloud network infrastructure, packet loss or delay may be minimized.

Here, in order to receive the STL unicast stream from the broadcast gateway apparatus 610 over a public network, each of the transmitters 631 and 632 may deliver a reception registration request message, including information thereabout (e.g., a UDP reception port or the like), to the broadcast gateway apparatus 610.

Here, in the method for broadcast gateway signaling according to an embodiment of the present invention, authentication of the reception registration request message, received from the transmitter, may be performed using the public key of the transmitter.

Here, the reception registration request message may include a message sequence number, the identifier of the public key of the transmitter, a UDP port number, and the private key signature of the transmitter.

Here, a message authentication code based on the private key signature of the transmitter is verified using the public key of the transmitter, whereby authentication of the reception registration request message may be performed.

For example, assuming that the transmitter A 631, illustrated in FIG. 6, transmits a reception registration request message to the broadcast gateway apparatus 610, the broadcast gateway apparatus 610 may acquire the public key of the transmitter A 631 (A's public key), stored in the internal memory thereof, using the identifier of the public key of the transmitter, which is included in the reception registration request message. Then, the authentication code based on the private key signature of the transmitter, which is included in the reception registration request message, is checked using the public key of the transmitter A 631 (A's public key), whereby authentication of the reception registration request message may be performed.

When authentication of the reception registration request message succeeds, information about the address of the STL stream cache server may be provided to the transmitter.

In the above example, when the reception registration request message transmitted from the transmitter A 631 is verified to be a normal registration request, information about the address of the STL stream cache server 621, which is an edge cloud node located close to the transmitter A 631, may be transmitted to the transmitter A 631 by disposing the same in a response message.

Then, when a successful response is received in response to the registration request made to the broadcast gateway apparatus 610, the transmitter A 631 may receive an STL unicast stream from the broadcast gateway apparatus 610 normally.

However, because the STL unicast stream is based on an IP/UDP/RTP packet stream over a public network, packet loss or delay may occur when it is transmitted.

Accordingly, when packet loss or delay occurs during reception of the STL unicast stream, the transmitter A 631 may request retransmission of the lost packet using the information about the address of the STL stream cache server 621, which is acquired from the response to the reception registration request message.

Here, because the transmitter A 631 is not able to wait for the recovery of the STL stream indefinitely due to the characteristics of real-time broadcast, a recovery process for the lost packets is performed during the reception wait time set in the STL propagation delay time field in the header of the outer packet, after which a continuous STL stream may be formed based thereon, and may then be transmitted.

Figure 7:
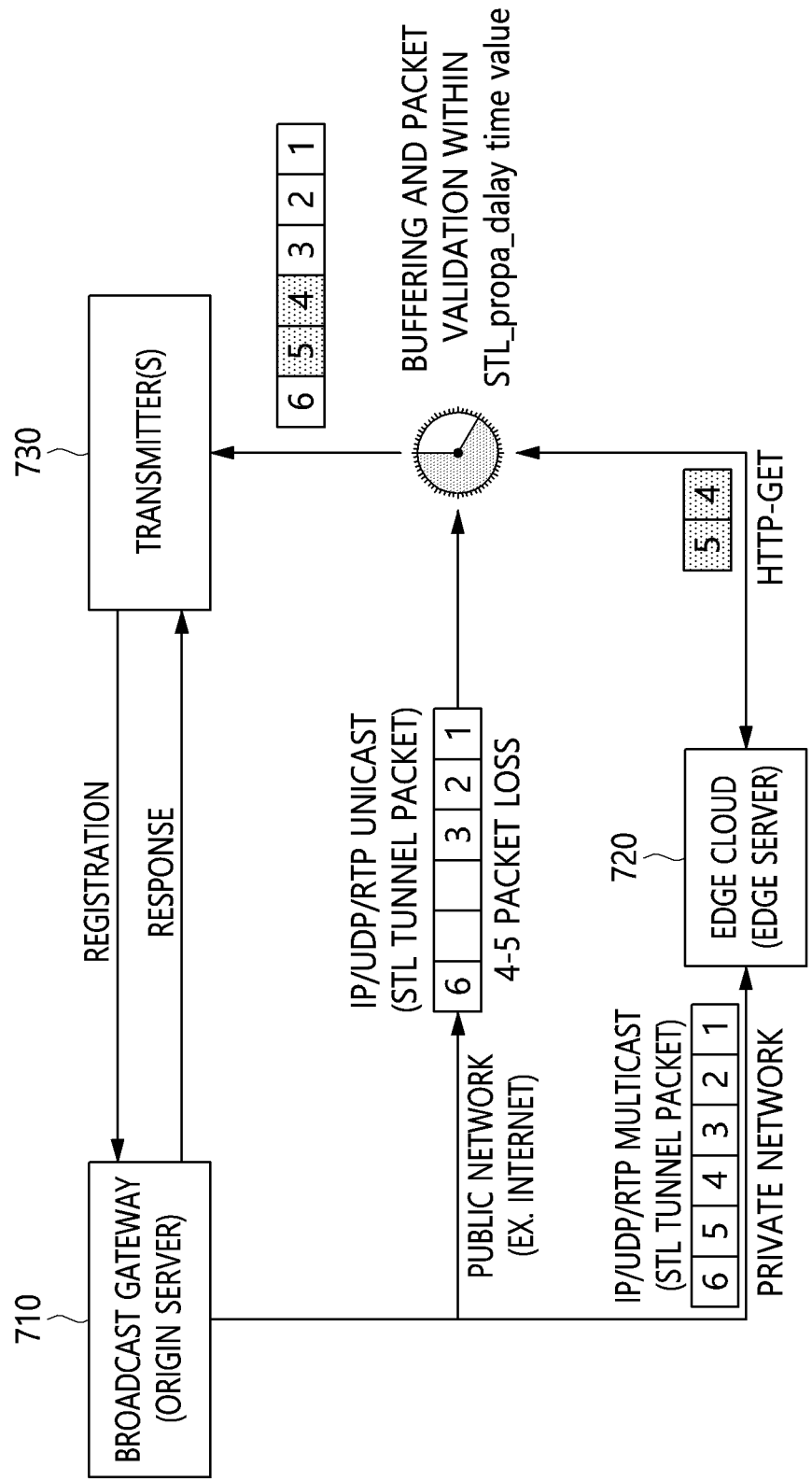
FIG. 7 is a block diagram illustrating a lost packet recovery process according to an embodiment of the present invention.

For example, referring to FIG. 7, when a reception registration request and a response thereto between the broadcast gateway apparatus 710 and a transmitter 730 are processed successfully, the broadcast gateway apparatus 710 may transmit an outer packet (STL tunnel packet) based on an IP/UDP/RTP unicast protocol stack to the transmitter 730 over a public network. When packet loss (e.g., 4-5 packet loss) occurs as illustrated in FIG. 7 in the process of receiving the outer packet, the transmitter 730 may perform a packet recovery process (e.g., using an HTTP protocol) along with an edge cloud node, corresponding to the STL stream cache server 720, during the reception wait time set in the 'STL_propa_delay' field.

Also, although not illustrated in FIG. 2, in the method for broadcast gateway signaling according to an embodiment of the present invention, the public key of the transmitter may be shared with the STL stream cache server.

Here, after it stably receives the STL stream (origin STL stream), generated by the broadcast gateway apparatus and transmitted in the form of a multicast stream in an environment in which cloud infrastructure is constructed, the STL stream cache server may store only RTP packet streams requested from the transmitter within a fixed time (the reception wait time set in the STL propagation delay time field) by configuring a cache pool therefor.

For example, information necessary for storing an RTP packet stream in the STL stream cache server may be as shown in Table 1.

TABLE 1

| field name | description | length | comment |
| --- | --- | --- | --- |
| STL_ID | STL stream identification value | 4 bytes | IP multicast address |
| STL_group_num | number of transmitters | N | number of transmitters in STL group (up to 128) |
| Pub_key_id[ ] | identifier of public key | 8 bytes * N | identifiers of public keys of transmitters (STL/SFN group) |
| Pub_key_file_data[ ] | public key identification value | variable bytes * N | public key identification values of transmitters (STL/SFN group) |
| RTP_info[ ] | RTP packet data | Fixed size (ex: 1500 bytes) * n | RTP packet data cache pool: caching packet data during STL propagation delay time |
| STL_propa_delay | STL propagation delay time (reception wait time) | 6 bits (ex: 63msec) | maximum propagation delay time in STL between broadcast gateway and transmitter |

Here, referring to Table 1, STL_ID for identifying an STL stream corresponds to the IP address of a multicast stream, and public key information (Pub_key_id and Pub_key_file_data) of the transmitters included in an STL/SFN group may be shared in advance in the process of setting a multicast transmission channel with a broadcast gateway apparatus.

Also, the RTP packets are stored in data storage in the order in which they are received, and by referring to the value of the STL propagation delay time field (STL_propa_delay) included in the RTP header, a cache pool for only the packets within the corresponding time may be managed.

Here, authentication of a recovery packet request message, transmitted by a transmitter to the STL stream cache server, is performed based on the public key of the transmitter, and the lost packet recovery process may be performed when authentication succeeds.

For example, upon receiving a request for an RTP packet, included in the STL stream, from transmitters, an edge cloud node operating an STL stream cache server may transmit the corresponding RTP packet data after verification of the transmitter information (Pub_key_id and Pub_key_file_data) in Table 1.

Through the above-described method for broadcast gateway signaling, efficient transmission of STL unicast packets may be guaranteed using an edge cloud in a cloud environment, and the expense of a dedicated network for respective transmitters may be effectively reduced.

Also, using widespread cloud infrastructure, the expense of a dedicated network used for an STL section between an existing broadcast gateway and transmitters may be reduced while adhering to the ATSC 3.0 standard specification as closely as possible.

Also, packet loss or delay, which can occur during fast transmission of a unidirectional unicast stream, may be responded to by receiving a recovery packet using an edge cloud.

Figure 8:
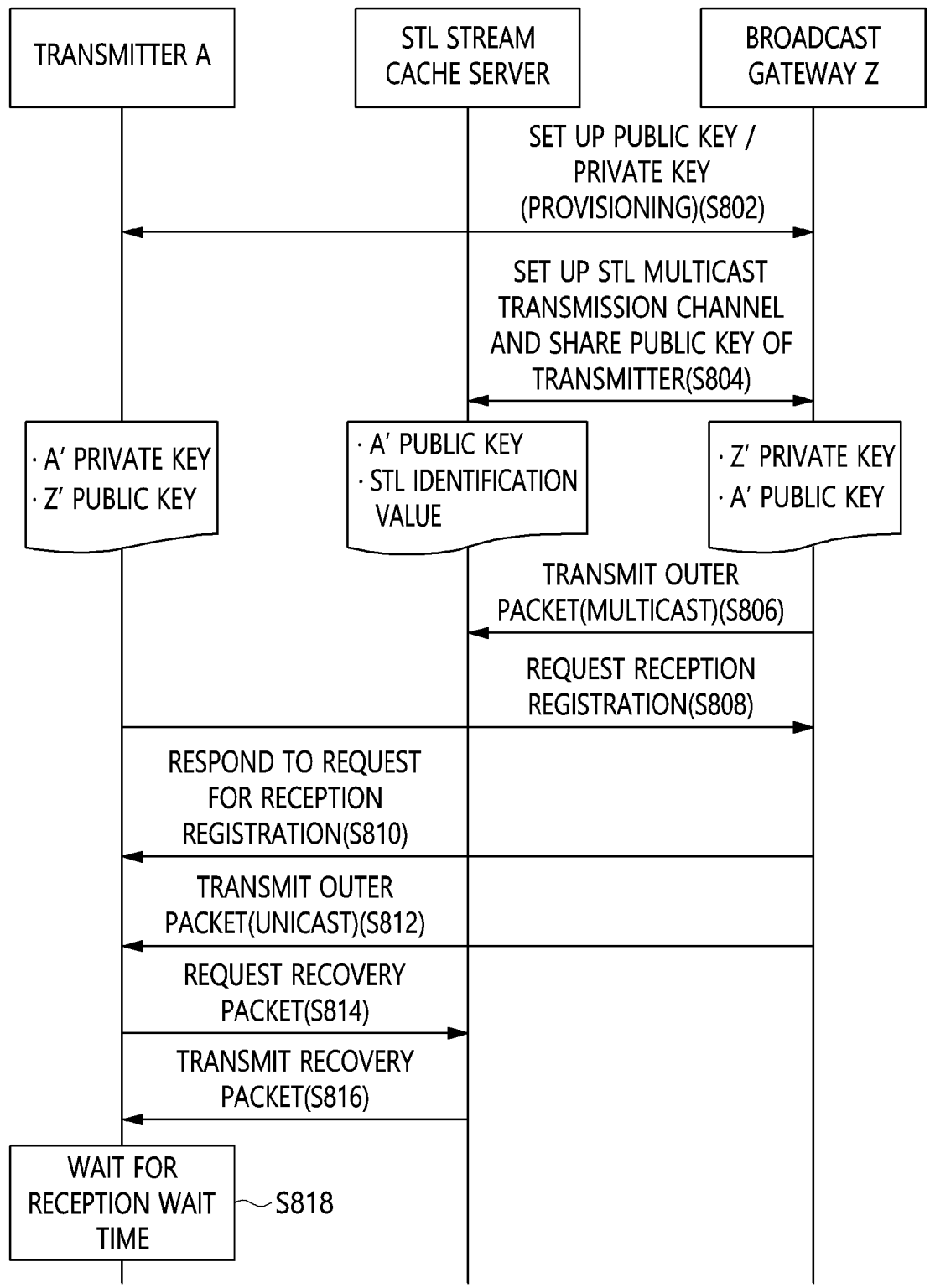
FIG. 8 is a view illustrating a lost packet recovery process according to an embodiment of the present invention in detail.

FIG. 8 is a view illustrating a lost packet recovery process according to an embodiment of the present invention in detail.

Referring to FIG. 8, a broadcast gateway apparatus and an edge STL stream cache server operate in a cloud infrastructure environment, and the setup of a public key and a private key may be performed through a key delivery process with a transmitter at step S802.

Here, the broadcast gateway apparatus may store the private key thereof (Z's private key) and the public key of the transmitter A included in an STL/SFN group (namely, A's public key), and the transmitter A may store the private key thereof (A's private key) and the public key of the broadcast gateway apparatus (Z's public key).

Then, the broadcast gateway apparatus may share the public key of the transmitter A included in the STL/SFN group (namely, A's public key) in advance with the STL stream cache server at step S804.

When the above-described preparation process is completed, the broadcast gateway apparatus may generate an outer packet and transmit the same to the STL stream cache server in a multicast manner at step S806.

Here, the STL stream cache server may receive the corresponding outer packet and store the same in a cache pool.

Here, in order to identify two or more outer packets, an IP multicast address may be used as the identifier of each of the packets.

Here, the broadcast gateway apparatus securely stores an authentication key used for signing the packet in order to authenticate the STL packet. The broadcast gateway apparatus may encrypt the authorization key with a session key, which is newly generated at regular intervals, and store the same.

Then, the transmitter A may deliver a reception registration request message to the broadcast gateway apparatus at step S808 in order to receive the STL stream.

Here, the reception registration request message, containing a sequence number (seq_no) for identifying request and response messages, the identifier of the public key (pub_key_id) of the transmitter A, and a UDP port number (udp_port) for receiving the STL stream, is signed with the private key in order to include the credential information of the transmitter A, and is then transmitted.

Here, upon receiving the reception registration request message from the transmitter A, the broadcast gateway apparatus may use the value of the public key of the transmitter A in order to verify the validity of the corresponding message (the suitability of the transmitter included in the STL group).

Then, when authentication of the reception registration request message succeeds, the broadcast gateway apparatus may create a reception registration response message containing a message sequence number (seq_no), the stream identification value (STL_id) of the SFN/STL group in which the transmitter A is included, and the access address (Edge_url) of the STL stream cache server therein, sign the reception registration response message with the private key thereof (Z's private key), and transmit the same to the transmitter A at step S810.

Then, the transmitter A may verify the validity of the response message, received as a response to the reception registration request, using the sequence number (seq_no) contained in the reception registration response message and the public key of the broadcast gateway apparatus (Z's public key) stored in the transmitter A, and may acquire the stream identification value (STL_id) and the access address (Edge_url) of the STL stream cache server. Then, the transmitter A may receive an outer packet (STL unicast stream) from the broadcast gateway apparatus through a UDP reception port (udp_port) at step S812.

Here, the outer packets (STL unicast streams) transmitted from the broadcast gateway apparatus are IP/UDP/RTP-based unidirectional transmission packets, and packet loss or delay may occur due to the characteristics of a public network.

Therefore, for the lost or delayed packets, the transmitter A may transmit a recovery packet request message for recovering the corresponding packet stream to the STL stream cache server during a fixed reception time at step S814.

Here, the recovery packet request message may include a stream identification value (STL_id) and the RTP sequence numbers (from, to) of recovery packets, and may be transmitted after signing the same with the private key of the transmitter A.

Then, after it verifies the recovery packet request message received from the transmitter A, the STL stream cache server may reply with the corresponding RTP packet data as a recovery packet at step S816.

Here, the transmitter A may repeatedly perform RTP packet recovery in consideration of the STL propagation delay time set between the broadcast gateway apparatus and the transmitter A (the reception wait time set in the STL propagation delay time field of the header of the outer packet) in order to form a complete STL stream (continuous RTP packet stream) before the transmission time of a physical layer frame.

Here, when a complete STL stream (broadcast transmission signal) is formed within the STL propagation delay time, a normal RF transmission process may be performed by the transmitter A at step S818.

If a complete STL stream cannot be formed within the STL propagation delay time, the STL stream during the corresponding time section is filled with null packets according to device operation policies related to packet loss/delay or failure in authentication, after which the RF transmission process is performed, or the packets of the corresponding section are discarded.

Figure 9:
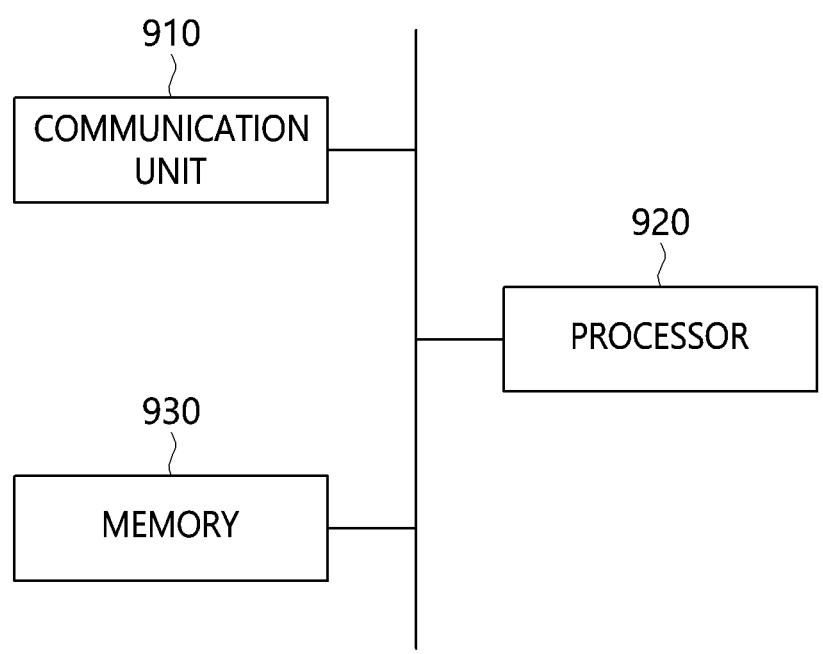
FIG. 9 is a block diagram illustrating a broadcast gateway apparatus according to an embodiment of the present invention.

FIG. 9 is a block diagram illustrating a broadcast gateway apparatus according to an embodiment of the present invention.

Referring to FIG. 9, the broadcast gateway apparatus according to an embodiment of the present invention includes a communication unit 910, a processor 920, and memory 930.

The communication unit 910 may serve to transmit and receive information required for broadcast gateway signaling through a communication network. Here, the network provides a path through which data is delivered between devices, and may be conceptually understood to encompass networks that are currently being used and networks that have yet to be developed.

For example, the network may be an IP network, which provides service for transmission and reception of a large amount of data and uninterrupted data service through an Internet Protocol (IP), an all-IP network, which is an IP network structure that integrates different networks based on IP, or the like, and may be configured as a combination of one or more of a wired network, a Wireless Broadband (WiBro) network, a 3G mobile communication network including WCDMA, a High-Speed Downlink Packet Access (HSDPA) network, a 3.5G mobile communication network including an LTE network, a 4G mobile communication network including LTE advanced, a satellite communication network, and a Wi-Fi network.

Also, the network may be any one of a wired/wireless local area network for providing communication between various kinds of data devices in a limited area, a mobile communication network for providing communication between mobile devices or between a mobile device and the outside thereof, a satellite communication network for providing communication between earth stations using a satellite, and a wired/wireless communication network, or may be a combination of two or more selected therefrom. Meanwhile, the transmission protocol standard for the network is not limited to existing transmission protocol standards, but may include all transmission protocol standards to be developed in the future.

The processor 920 generates an outer packet corresponding to the outer layer of a tunneling system using an inner packet corresponding to the inner layer of the tunneling system.

Also, the processor 920 generates a header of the outer packet and transmits the outer packet to a transmitter through a Studio-to-Transmitter Link (STL).

For example, referring to FIG. 3, the broadcast gateway apparatus according to an embodiment of the present invention includes an inner packet generator 310, an outer packet header generator 320, an outer packet generator 330, and an STL transmission unit 340.

The inner packet generator 310 generates an inner packet, corresponding to the inner layer of a tunneling system, by including a baseband packet, a preamble, and a timing and management (Timing & Management) packet.

The outer packet generator 330 generates an outer packet, corresponding to the outer layer of the tunneling system, using the inner packet.

The outer packet header generator 320 generates a header of the outer packet.

The STL transmission unit 340 transmits the outer packet to a transmitter through a Studio-to-Transmitter Link (STL).

Here, the inner packet may be encapsulated through the outer packet.

Here, the tunneling system may correspond to a process by which a group of parallel and independent packet streams corresponding to the inner packets is carried within a single packet stream corresponding to the outer packet.

Here, the outer packet may be a broadcast transmission packet.

Here, the outer packet may be transmitted through an RTP/UDP/IP unicast protocol stack.

Here, in order to stably transmit the STL unicast stream to the transmitters included in an STL/SFN group, the broadcast gateway apparatus notifies the transmitters of a wait time for receiving the packet, thereby enabling RF transmission by the transmitters to be performed normally.

To this end, the header of the outer packet may include an STL propagation delay time field, which indicates a reception wait time for an STL stream corresponding to the outer packet.

Here, the time set in the STL propagation delay time field may be a reception wait time or an STL propagation delay time.

Here, the STL propagation delay time field is a 6-bit field, and may be set to an integer ranging from '0' to '63', which indicates time in units of milliseconds.

For example, the header of an outer packet (a broadcast transmission packet or a tunneling packet) may be generated as illustrated in FIG. 4.

Referring to FIG. 4, the header of an outer packet corresponds to RTP_Fixed_header( ), and the STL propagation delay time field may correspond to 'STL_propa_delay'.

For example, the field 'STL_propa_delay' (6 bits) may be defined by including the same in the reserved field (10 bits) of RTP_Fixed_Header( ).

Here, 'uimsbf' means 'unsigned integer, most significant bit first'.

Here, the header of the outer packet in FIG. 4 may be a kind of RTP header.

Here, all of the devices receiving STL unicast/multicast streams through the broadcast gateway apparatus may reassemble RTP packets during the reception wait time of the packet, which is set in the 'STL_propa_delay' field.

Therefore, the value of the 'STL_propa_delay' field may be considered when RTP packet recovery is repeatedly performed in order to enable a transmitter to form a complete STL stream (a continuous RTP packet stream) before the transmission time of a physical layer frame.

In other words, the reception wait time may be the time during which the transmitter forms the broadcast transmission signal to transmit to an RF channel using the outer packet.

For example, referring to FIG. 5, in the event of loss of the outer packet (RTP tunnel packet) transmitted from the broadcast gateway apparatus 510 to the transmitter 520, a lost packet recovery process may be repeatedly performed during the reception wait time 530 set in the 'STL_propa_delay' field of RTP_Fixed_Header( ).

Here, the RTP tunneled packet illustrated in FIG. 5 may be an inner packet, and Packet_Release_Time( ) or Bootstrap_Timing_Data( ) of Timing&Management_Packet Payload( ) may correspond to an existing time field according to the A/324 standard.

If a continuous RTP packet stream cannot be formed within the reception wait time set in the STL propagation delay time field (in the event of packet loss/delay or failure in authentication), the STL stream for the corresponding time section is filled with null packets according to a device operation policy, after which an RF transmission process may be performed, or the packets of the corresponding section may be discarded.

For example, when the value of the 'STL_propa_delay' field is set to '10', the reception wait time of a corresponding outer packet is 10 milliseconds, and the transmitter repeatedly performs RTP packet recovery for the outer packet within 10 milliseconds, thereby forming the broadcast transmission signal to transmit to an RF channel.

Here, the lost packet recovery process may be performed through a Studio-to-Transmitter Link (STL) stream cache server that operates as an edge cloud node in a cloud infrastructure environment.

For example, the present invention may provide the configuration illustrated in FIG. 6 in order to guarantee stable transmission of an STL stream over a public network using an edge cloud in a cloud infrastructure environment.

Referring to FIG. 6, the ATSC 3.0 broadcast gateway apparatus 610 (broadcast gateway Z) may operate in a cloud infrastructure environment, and may have settings in which it can transmit an STL multicast stream to edge cloud nodes.

Here, the edge cloud nodes may correspond to STL stream cache servers 621 and 622.

Following the recommendation of the technology standard (A/324), the broadcast gateway apparatus 610 based on ATSC 3.0 and the transmitters 631 and 632, illustrated in FIG. 6, may apply a packet authentication method in order to respond to a man-in-the-middle attack in the STL section.

To this end, the method for broadcast gateway signaling according to an embodiment of the present invention may include sharing a public key between the broadcast gateway apparatus and the transmitters based on a key delivery process.

For example, referring to FIG. 6, the broadcast gateway apparatus 610 may share a public key with the transmitters 631 and 632, included in an STL/SFN group, in advance. Through this key delivery process, the broadcast gateway apparatus 610 may store the private key thereof (Z's private key), the public key of the transmitter A (A's public key), and the public key of the transmitter B (B's public key), the transmitter A 631 may store the private key thereof (A's private key) and the public key of the broadcast gateway apparatus (Z's public key), and the transmitter B 632 may store the private key thereof (B's private key) and the public key of the broadcast gateway apparatus (Z's public key).

Then, the broadcast gateway apparatus 610 may transmit an STL multicast stream having the same format as that in the existing standard to the STL stream cache servers 621 and 622 corresponding to the edge cloud nodes after applying packet authentication thereto.

Here, the STL stream cache servers 621 and 622 may store the STL multicast stream received from the broadcast gateway apparatus 610 in a cache pool for a limited amount of time.

That is, a cache pool may be configured for a packet, of which the reception wait time set in the STL propagation delay time field has not expired, among the outer packets transmitted to the STL stream cache server.

Here, the STL stream transmitted from the broadcast gateway apparatus 610 corresponds to an outer packet. The outer packet may be transmitted to the STL stream cache server in the form of a multicast packet through an RTP/UDP/IP multicast protocol stack, and may be transmitted to a transmitter in the form of a unicast packet through an RTP/UDP/IP unicast protocol stack.

Here, because the STL multicast stream is transmitted over a dedicated network between the broadcast gateway apparatus 610 and the STL stream cache servers 621 and 622, corresponding to the edge cloud nodes, in cloud network infrastructure, packet loss or delay may be minimized.

Here, in order to receive the STL unicast stream from the broadcast gateway apparatus 610 over a public network, each of the transmitters 631 and 632 may deliver a reception registration request message, including information thereabout (e.g., a UDP reception port or the like), to the broadcast gateway apparatus 610.

Here, in the method for broadcast gateway signaling according to an embodiment of the present invention, authentication of the reception registration request message received from the transmitter may be performed using the public key of the transmitter.

Here, the reception registration request message may include a message sequence number, the identifier of the public key of the transmitter, a UDP port number, and the private key signature of the transmitter.

Here, a message authentication code based on the private key signature of the transmitter is verified using the public key of the transmitter, whereby authentication of the reception registration request message may be performed.

For example, assuming that the transmitter A 631, illustrated in FIG. 6, transmits a reception registration request message to the broadcast gateway apparatus 610, the broadcast gateway apparatus 610 may acquire the public key of the transmitter A 631 (A's public key), stored in the internal memory thereof, using the identifier of the public key of the transmitter, which is included in the reception registration request message. Then, the authentication code based on the private key signature of the transmitter, which is included in the reception registration request message, is checked using the public key of the transmitter A 631 (A's public key), whereby authentication of the reception registration request message may be performed.

Here, when authentication of the reception registration request message succeeds, information about the address of the STL stream cache server may be provided to the transmitter.

In the above example, when the reception registration request message transmitted from the transmitter A 631 is verified to be a normal registration request, information about the address of the STL stream cache server 621, which is an edge cloud node located close to the transmitter A 631, may be transmitted to the transmitter A 631 by disposing the same in a response message.

Then, when a successful response is received in response to the registration request made to the broadcast gateway apparatus 610, the transmitter A 631 may receive an STL unicast stream from the broadcast gateway apparatus 610 normally.

However, because the STL unicast stream is based on an IP/UDP/RTP packet stream over a public network, packet loss or delay may occur when it is transmitted.

Accordingly, when packet loss or delay occurs during reception of the STL unicast stream, the transmitter A 631 may request retransmission of the lost packet using the information about the address of the STL stream cache server 621, which is acquired from the response to the reception registration request message.

Here, because the transmitter A 631 is not able to wait for the recovery of the STL stream indefinitely due to the characteristics of real-time broadcast, a recovery process for the lost packets is performed during the reception wait time set in the STL propagation delay time field in the header of the outer packet, after which a continuous STL stream may be formed based thereon, and may then be transmitted.

For example, referring to FIG. 7, when a reception registration request and a response thereto between the broadcast gateway apparatus 710 and a transmitter 730 are successfully processed, the broadcast gateway apparatus 710 may transmit an outer packet (STL tunnel packet) based on an IP/UDP/RTP unicast protocol stack to the transmitter 730 over a public network. When packet loss (e.g., 4-5 packet loss) occurs as illustrated in FIG. 7 in the process of receiving the outer packet, the transmitter 730 may perform a packet recovery process (e.g., using an HTTP protocol) along with an edge cloud node, corresponding to the STL stream cache server 720, during the reception wait time set in the 'STL_propa_delay' field.

Also, the processor 920 may share the public key of the transmitter with the STL stream cache server.

Here, after it stably receives the STL stream (origin STL stream), generated by the broadcast gateway apparatus and transmitted in the form of a multicast stream in an environment in which cloud infrastructure is constructed, the STL stream cache server may store only RTP packet streams requested from the transmitter within a fixed time (the reception wait time set in the STL propagation delay time field) by configuring a cache pool therefor.

In an example, information necessary for storing an RTP packet stream in the STL stream cache server may be as shown in Table 1 above.

Here, referring to Table 1, STL_ID for identifying an STL stream corresponds to the IP address of a multicast stream, and public key information (Pub_key_id and Pub_key_file_data) of the transmitters included in an STL/SFN group may be shared in advance in the process of setting a multicast transmission channel with the broadcast gateway apparatus.

Also, the RTP packets are stored in data storage in the order in which they are received, and by referring to the value of the STL propagation delay time field (STL_propa_delay) included in the RTP header, a cache pool for only the packets within the corresponding time may be managed.

Here, authentication of a recovery packet request message, transmitted by a transmitter to the STL stream cache server, is performed based on the public key of the transmitter, and the lost packet recovery process may be performed when authentication succeeds.

For example, when it receives a request for an RTP packet, included in the STL stream, from transmitters, an edge cloud node operating an STL stream cache server may transmit the corresponding RTP packet data after verification of the transmitter information (Pub_key_id and Pub_key_file_data) in Table 1.

The memory 930 stores the outer packet.

Also, the memory 930 stores various kinds of information generated in the above-described broadcast gateway apparatus according to an embodiment of the present invention.

According to an embodiment, the memory 930 may be separate from the broadcast gateway apparatus, and may support the function for broadcast gateway signaling. Here, the memory 930 may operate as separate mass storage, and may include a control function for performing operations.

Meanwhile, the broadcast gateway apparatus includes memory installed therein, whereby information may be stored therein. In an embodiment, the memory is a computer-readable medium. In an embodiment, the memory may be a volatile memory unit, and in another embodiment, the memory may be a nonvolatile memory unit. In an embodiment, the storage device is a computer-readable recording medium. In different embodiments, the storage device may include, for example, a hard-disk device, an optical disk device, or any other kind of mass storage device.

Using the above-described broadcast gateway apparatus, efficient transmission of an STL unicast packet may be guaranteed using an edge cloud in a cloud environment, and the expense of a dedicated network for respective transmitters may be effectively reduced.

Also, using widespread cloud infrastructure, the expense of a dedicated network used for an STL section between an existing broadcast gateway and transmitters may be reduced while adhering to the ATSC 3.0 standard specification as closely as possible.

Also, packet loss or delay, which can occur during fast transmission of a unidirectional unicast stream, may be responded to by receiving a recovery packet using an edge cloud.

Figure 10:
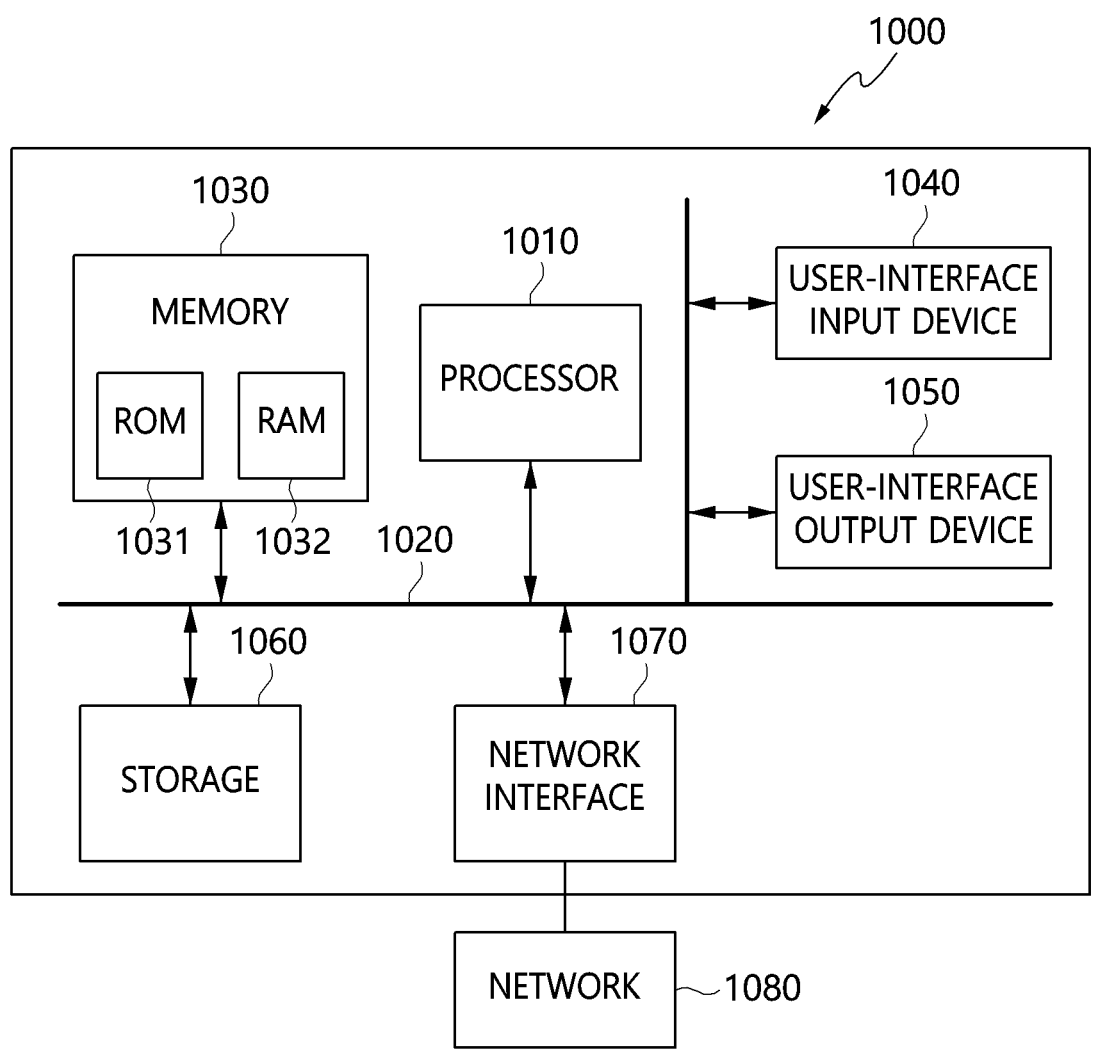
FIG. 10 is a view illustrating a computer system according to an embodiment of the present invention.

FIG. 10 is a view illustrating a computer system according to an embodiment of the present invention.

Referring to FIG. 10, an embodiment of the present invention may be implemented in a computer system including a computer-readable recording medium. As illustrated in FIG. 10, the computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing processing instructions stored in the memory 1030 or the storage 1060. The memory 1030 and the storage 1060 may be any of various types of volatile or nonvolatile storage media. For example, the memory may include ROM 1031 or RAM 1032.

Accordingly, an embodiment of the present invention may be implemented as a nonvolatile computer-readable storage medium in which methods implemented using a computer or instructions executable in a computer are recorded. When the computer-readable instructions are executed by a processor, the computer-readable instructions may perform a method according to at least one aspect of the present invention.

According to the present invention, efficient transmission of STL unicast packets may be guaranteed using an edge cloud in a cloud environment, and the expense of a dedicated network for respective transmitters may be effectively reduced.

Also, the present invention uses widespread cloud infrastructure, thereby reducing the expense of a dedicated network used for an STL section between an existing broadcast gateway and transmitters while adhering to the ATSC 3.0 standard specification as closely as possible.

Also, the present invention enables reception of a recovery packet using an edge cloud, thereby responding to packet loss or delay, which can occur during fast transmission of a unidirectional unicast stream.

As described above, the method for broadcast gateway signaling using a cloud network and the apparatus for the same according to the present invention are not limitedly applied to the configurations and operations of the above-described embodiments, but all or some of the embodiments may be selectively combined and configured, so that the embodiments may be modified in various ways.

What is claimed is:

1. A method for broadcast gateway signaling, comprising:
generating an outer packet corresponding to an outer layer of a tunneling system using an inner packet corresponding to an inner layer of the tunneling system; and
generating a header of the outer packet and transmitting the outer packet to a transmitter through a Studio-to-Transmitter Link (STL),
wherein the header includes an Slit propagation delay time field representing a reception wait time for an STL stream corresponding to the outer packet, and
wherein the STL propagation delay time field is a 6-bit field, and is set to an integer ranges from '0' to '63', indicating time in units of milliseconds.

2. The method of claim 1, wherein the reception wait time is a time during which the transmitter forms a broadcast transmission signal to transmit to an RF channel using the outer packet.

3. The method of claim 1, wherein, when loss occurs in the outer packet transmitted to the transmitter, a lost packet recovery process is repeatedly performed during the reception wait time.

4. The method of claim 3, wherein the lost packet recovery process is performed through a Studio-to-Transmitter Link (STL) stream cache server that operates as an edge cloud node in a cloud infrastructure environment.

5. The method of claim 4, wherein the outer packet is transmitted to the STL stream cache server in a form of a multicast packet through an RTP/UDP/IP multicast protocol stack and is transmitted to the transmitter in a form of a unicast packet through an RTP/UDP/IP unicast protocol stack.

6. The method of claim 4, wherein a cache pool for a packet, a reception wait time of which has not expired, among outer packets transmitted to the STL stream cache server, is formed.

7. The method of claim 4, further comprising:
sharing a public key with the transmitter based on a key delivery process;
performing authentication of a reception registration request message received from the transmitter using a public key of the transmitter; and
providing information about an address of the STL stream cache server to the transmitter when the authentication succeeds.

8. The method of claim 7, wherein:
the reception registration request message includes a message sequence number, an identifier of the public key of the transmitter, a UDP port number, and a private key signature of the transmitter, and
the authentication is performed in such a way that a message authentication code based on the private key signature of the transmitter is checked using the public key of the transmitter.

9. The method of claim 7, further comprising:
sharing the public key of the transmitter with the STL stream cache server,
wherein the lost packet recovery process is performed when authentication of a recovery packet request message, transmitted by the transmitter to the STL stream cache server, succeeds, the authentication being performed based on the public key of the transmitter.

10. The method of claim 3, wherein, when a lost packet is not recovered during the reception wait time, the lost packet is processed by at least one of inputting a null packet and discarding the lost packet.

11. The method of claim 1, wherein the inner packet is encapsulated through the outer packet.

12. The method of claim 1, wherein the tunneling system is configured such that a group of parallel and independent packet streams, corresponding to the inner packet, is carried within a single packet stream corresponding to the outer packet.

13. A broadcast gateway apparatus, comprising:
a processor for generating an outer packet corresponding to an outer layer of a tunneling system using an inner packet corresponding to an inner layer of the tunneling system, generating a header of the outer packet, and transmitting the outer packet to a transmitter through a Studio-to-Transmitter Link (STL); and
memory for storing the outer packet,
wherein the header includes an STL propagation delay time field representing a reception wait time for an STL stream corresponding to the outer packet, and
wherein the SU, propagation delay time field is a 6-bit field, and is set to an integer ranges from '0' to '63', indicating time in units of milliseconds.

14. The broadcast gateway apparatus of claim 13, wherein the reception wait time is a time during which the transmitter forms a broadcast transmission signal to transmit to an RF channel using the outer packet.

15. The broadcast gateway apparatus of claim 13, wherein, when loss occurs in the outer packet transmitted to the transmitter, a lost packet recovery process is repeatedly performed during the reception wait time.

16. The broadcast gateway apparatus of claim 15, wherein the lost packet recovery process is performed through a Studio-to-Transmitter Link (STL) stream cache server that operates as an edge cloud node in a cloud infrastructure environment.

17. The broadcast gateway apparatus of claim 16, wherein the outer packet is transmitted to the STL stream cache server in a form of a multicast packet through an RTP/UDP/IP multicast protocol stack and is transmitted to the transmitter in a form of a unicast packet through an RTP/UDP/IP unicast protocol stack.

18. The broadcast gateway apparatus of claim 16, wherein a cache pool for a packet, a reception wait time of which has not expired, among outer packets transmitted to the STL stream cache server, is formed.

* * * * *